United States Patent [19]

Martin

[11] 4,205,874

[45] Jun. 3, 1980

[54] HIGH-LOW PROFILE GUARD

[76] Inventor: Robert P. Martin, 7809 W. 130th St., Parma, Ohio 44130

[21] Appl. No.: 869,052

[22] Filed: Jan. 13, 1978

[51] Int. Cl.$^2$ .............................................. B62D 25/06

[52] U.S. Cl. .................................................... 296/102

[58] Field of Search ..................... 296/102, 137 B, 107; 280/756; 293/62, 69

[56] References Cited

U.S. PATENT DOCUMENTS

| | | | |
|---|---|---|---|
| 1,715,379 | 6/1929 | Nicholas | 293/62 |
| 1,964,894 | 7/1934 | Rohne | 296/26 |
| 2,795,458 | 6/1957 | Wieschel | 296/102 |
| 2,911,232 | 11/1959 | Hastings, Jr. et al. | 280/756 |
| 3,259,211 | 7/1966 | Ryskamp | 280/756 X |
| 3,455,599 | 7/1969 | Becker | 296/102 |
| 3,841,213 | 3/1976 | Stammen | 296/107 X |
| 3,841,698 | 10/1974 | Stammen | 296/107 |
| 4,032,187 | 6/1977 | Atherton | 280/756 X |

*Primary Examiner*—John J. Love
*Assistant Examiner*—Norman L. Stack
*Attorney, Agent, or Firm*—Pearne, Gordon, Sessions, McCoy & Granger

[57] ABSTRACT

An overhead guard for a lift truck or the like being adjustable in height between an extended position for maximum operator convenience in normal use and a retracted position for use in areas of restricted overhead clearance. Full protection from falling overhead objects is afforded by the guard in both of its positions and counterbalancing means is provided to facilitate manual adjustment of the guard between its positions.

13 Claims, 8 Drawing Figures

Fig. 1
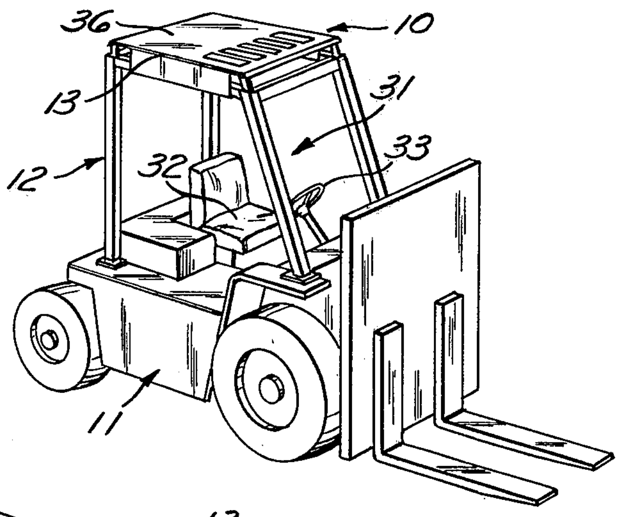
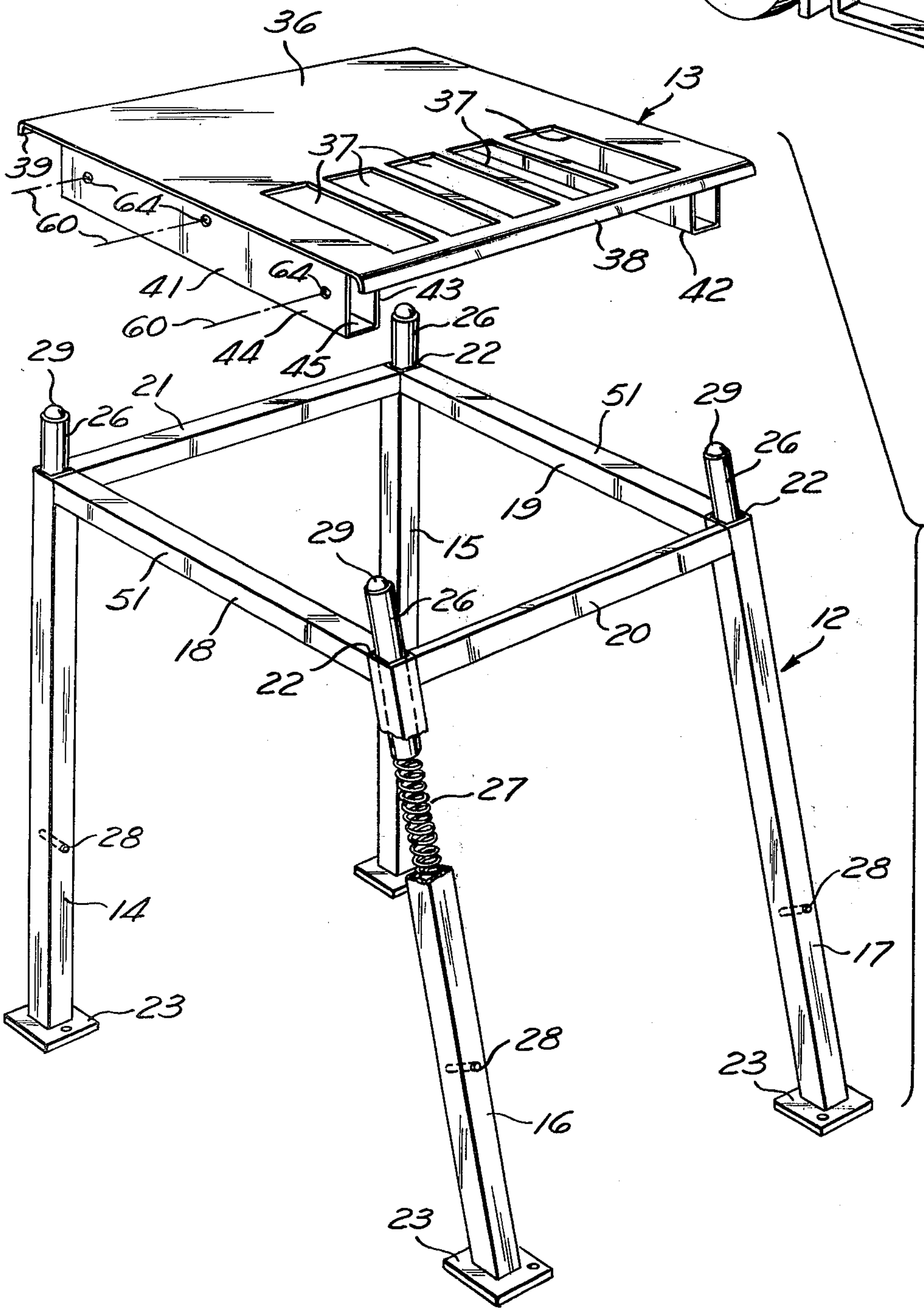
Fig. 2

Fig. 3
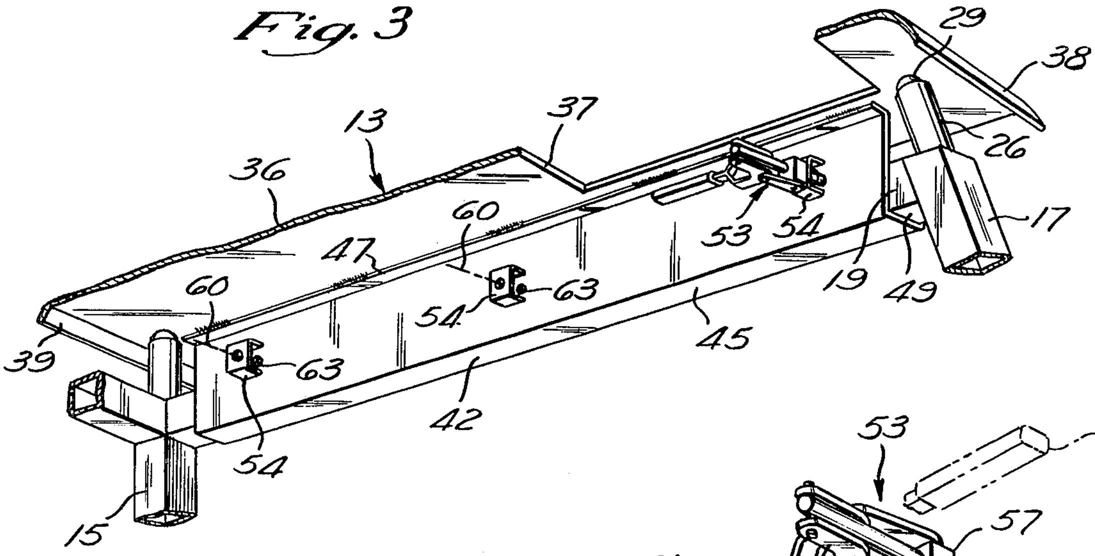
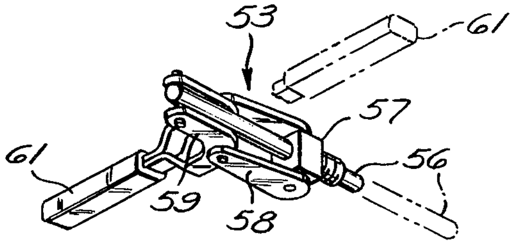
Fig. 4
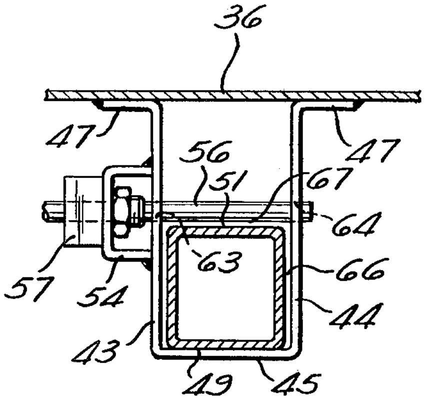
Fig. 5
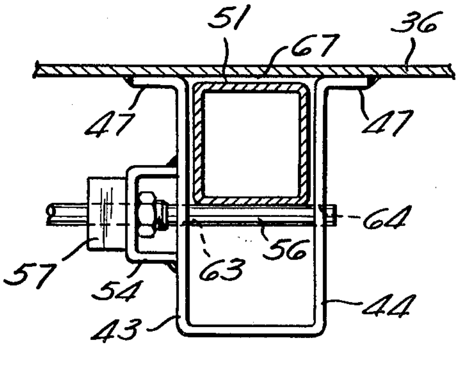
Fig. 6
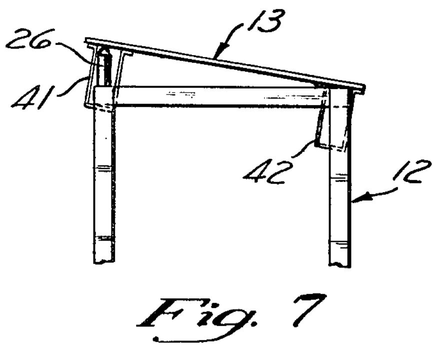
Fig. 7
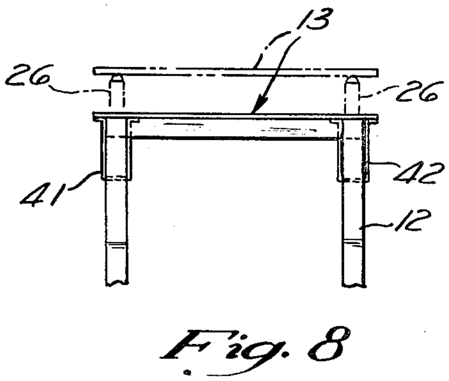
Fig. 8

HIGH-LOW PROFILE GUARD

BACKGROUND OF THE INVENTION

The invention relates to safety attachments for utility vehicles such as industrial lift trucks and in particular to an overhead guard for such vehicles.

PRIOR ART

Industrial lift trucks, tractors, and like utility vehicles have been provided with overhead guards for protection of the operator against falling objects. The risk of injury is relatively high where a vehicle is discharging or receiving material at an elevated point above the level of the operator station of the vehicle. In recognition of the potential dangers involved in such operations federal regulations where applicable require the use of an overhead guard and prescribe minimum limits of crush resistance for the protective structure.

In order to provide a high degree of head room for an operator overhead guards have characteristically presented a relatively high profile which has limited the ability of the vehicle to operate in areas of low overhead clearance. Commonly encountered areas of limited overhead clearance include doorways of semi-trailers and bulkhead passages in cargo ships. It is a present practice to remove overhead guards from lift trucks when the trucks are to be used in these or like areas of restricted vertical clearance and to reinstall these units when a job has been completed and the vehicle is to be used elsewhere. Even under the most ideal conditions periodic removal and replacement of a guard requires nonproductive labor. Moreover, an operator is exposed to risk during the period when a guard is deliberately removed and whenever a guard is inadvertently not replaced.

SUMMARY OF THE INVENTION

The invention provides an overhead guard capable of being used in either of two height settings whereby it is adapted under normal conditions to offer a high degree of head room for maximum operator comfort and convenience and in confined areas a reduced height for clearance of overhead structures. A crush resistant main frame structure of the guard is stationary with respect to the vehicle while a roof barrier is displaceable on the main frame for altering the overall height of the guard. This arrangement minimizes the mass which must be moved during adjustment thereby allowing the adjustment to be readily accomplished by manual effort, normally by the operator alone.

In the disclosed embodiment, the main frame is constructed of elongated structural elements interconnected in the manner of a space frame. The roof barrier is a generally planar structure extending substantially fully over and protecting substantially the full space enclosed by the frame from vertical intrusion. The planar barrier, is shiftable from an extended position spaced above the frame and a retracted position immediately above the frame. The roof barrier is counterbalanced to facilitate manual positioning between the extended and retracted positions and is guided by means which permits it to be raised or lowered one half at a time without binding or excessive friction.

BRIEF DESCRIPTION OF THE DRAWINGS

FIG. 1 is a perspective view of an overhead guard constructed in accordance with the invention and installed on a typical utility vehicle.

FIG. 2 is a perspective view on an enlarged scale of the overhead guard.

FIG. 3 is a fragmentary perspective view of a portion of the guard showing certain constructional details thereof.

FIG. 4 is a perspective view of a typical locking device provided to lock a roof barrier of the guard in one of its positions.

FIG. 5 is a fragmentary end view of the roof barrier in an extended postion on a supporting frame.

FIG. 6 is view similar to FIG. 5 but showing the roof barrier in a retracted position.

FIG. 7 is a partial front elevational view schematically illustrating the roof barrier in an intermediate position; and FIG. 8 is a view similar to FIG. 7 schematically illustrating the roof barrier in a retracted position in solid line and an extended position in phantom.

DESCRIPTION OF THE PREFERRED EMBODIMENT

FIG. 1 illustrates an overhead guard 10 mounted on a utility vehicle in the form of a conventional industrial lift truck 11 for material handling. The overhead guard comprises a rigid frame 12 and a roof barrier 13 movably supported on the frame.

The frame 12 is a weldment of square or rectangular steel tubing including a set of four straight legs 14–17 interconnected by a set of four straight header bars 18–21. The legs 14–17 are generally vertical although their upper ends may be tilted inwardly towards opposite legs to achieve a degree of triangulation for frame rigidity and for purposes of appearance.

In the illustrated arrangement the header bars 18–21 lie in a common horizontal plane and define the boarder of an area which has four sides in a manner of a rectangle or trapezoid. The end faces of the header bars 18–21 are butt welded to respective sides of the legs 14–17 adjacent end faces 22 of the latter. Rectangular or square flanges 23 are welded or otherwise fixed to the lower ends of the legs 14–17 and are provided with holes for convenient bolting to the vehicle 11. The upper end face 22 of each leg 14–17 is open to permit a roof barrier support pin 26 to telescope within the leg. The lower end of each support pin 26 is resiliently supported on a compression spring 17 disposed within the associated leg. In turn, a lower end of the spring 27 is supported by a cross-pin 28 or other suitable means within the respective leg. An anti-friction ball transfer assembly 29 is fixed to the upper end of each support pin 26. The ball transfer assemblies 29 are commercially available units each including a relatively large metal ball supported by a plurality of smaller balls in a spherical socket. The horizontal area bounded by the header bars 18–21 extends substantially completely over an operator station 31 of the vehicle 11 including an operator seat 32 and steering wheel 33.

A roof barrier 13 includes a substantially planar cover 36 fabricated from steel plate having dimensions slightly larger than the area bounded by the frame header bars 18–21. A series of holes 37 are cut in the plate 36 to provide overhead vision from the operator station 31. Leading and trailing edges of the cover plate 36 are bent downwardly to form stiffening flanges 38,39 respectively. A pair of elongated stirrups 41,42 are welded or otherwise fixed to the underside of the cover plate 36. Each stirrup 41,42 is U-shaped in cross section having vertical sidewall portions 43,44 and an intermediate horizontal bight portion 45. Outwardly directed horizontal flanges 47 integrally formed with the sidewall portions 43,44 are in engagement with the underside of the cover plate 36.

As indicated most clearly in FIGS. 3, 5 and 6, in assembly the stirrups 41,42 wrap under respective side header bars 18,19 while the cover plate is disposed over all of the header bars 18–21. The stirrups 41,42 have substantially the same length as the side header bars 18,19. In the illustrated case the side header bars 18,19 extending from the front to the back of the guard 10 are somewhat longer than the front and rear header bars 20,21. Under extreme service conditions the stirrups 41, 42 are adapted to contribute to the strength of the relatively longer side bars 18,19. The anti-friction support assemblies 29 bear against the underside of the roof barrier plate 36 and allow the springs to collectively support the weight of the roof barrier 13. The roof barrier is vertically displaceable on the frame 12 between elevated and retracted positions indicated in FIGS. 5 and 6 respectively. In the elevated position the bight portion 45 of each stirrup channel 41,42 abuts an underside 49 of the related header bar 18,19. In the retracted position the underside of the cover plate 36 abuts or is immediately adjacent an upper side 51 of each side header bar 18,19.

To maintain the roof barrier 13 in either of its positions locking means in the form of toggle pin assemblies 53 are provided on both of the stirrups 41,42. A typical toggle pin assembly 53 is shown in FIG. 4 where a release position is indicated in solid line and a locking position is indicated in phantom. The toggle pin assemblies 53 which are individually bolted to U-shaped brackets 54 on the stirrups 41,42 include a pin 56 slidably disposed in a mounting block 57 and a set of levers 58,59 one of which includes a manually manipulated handle 61. The pin assemblies 53 are each aligned, at spaced centers 60, with a pair of associated holes 63,64 in opposite stirrup sidewalls 43,44 through which a pin 56 is extended and retracted. The rearward and forward hole centers 60 are vertically disposed on the stirrup sidewalls 43,44 to permit the related pin assemblies 53 to maintain the barrier 13 in its raised or extended position as indicated in FIG. 5 with the stirrup bights 45 abutting or adjacent the undersides 49 of the side header bars 18,19. The intermediate pin centers 60 are arranged to permit the associated pin assemblies 53 to maintain the roof barrier in the lower position illustrated in FIG. 6 with the underside of the cover plate 36 at or adjacent upper sides 51 of the side header bars 18,19.

The extended or raised position indicated in phantom in FIG. 8 may be considered the normal position of the roof barrier 13. At this extended position full head clearance is provided for the operator. In work environments where the truck 11 must be occasionally operated in areas of limited overhead clearance such as through truck trailer doors or bulkhead openings in the holds of ships and the like, the roof barrier 13 is retracted to the full line position of FIG. 8. The roof barrier 13 is manually moved between the extended and retracted positions by withdrawing appropriate ones of the pins 56 and either manually pulling the barrier 13 down against the force of the springs 27 or allowing the springs to raise it. If desired, hand grips may be provided on the cover plate 36 to facilitate manual control. The counterbalancing springs 27 are dimensioned to exert a force in the extended position at least as great as the weight of the roof barrier 13. The stirrups 41, 42 serve to guide the roof barrier 13 vertically with respect to the frame 12 so that the extended and retracted barrier positions lie above or below one another without significant horizontal displacement relative to the vehicle 11. As suggested in FIG. 7, the roof barrier 13 may be retracted or extended stepwise one-half at a time. Such stepwise extension or retraction reduces the maximum effort required of the operator when manually adjusting the roof barrier 13. The stirrups, 41,42 are dimensioned with respect to the side header bars 18,19 to provide sufficient lateral clearance indicated at 66 and the pins 56 are located to provide sufficient vertical clearance indicated at 67 to permit this tilting of the roof barrier 13 to one side or the other with respect to the frame 12.

By way of example, the illustrated guard 10 when mounted on the vehicle 11 has a nominal height above ground of 81 inches when extended and is capable of retracting 4 inches from this height in the retracted position. The disclosed guard assembly 10 is capable of protecting an operator from overhead falling objects which would otherwise have a generally vertical trajectory towards the operator station 31. The frame structure 12 which generally surrounds the operator station 31 is capable of sustaining a blow of substantial energy without significant crushing. While the pins 56 maintaining the barrier 13 in its upper or extended position have limited strength as compared to the frame 12 failure of such pins under impact will result in a displacement of the roof barrier limited to only that equivalent to the retracted position. In this resulting position the frame 12 will be loaded by direct engagement with the cover plate 36 and further displacement of this plate is effectively prevented. As shown, the roof barrier and frame protect a relatively large area surrounding the operator seat and steering wheel to afford a high degree of protection from overhead falling objects.

Although a preferred embodiment of this invention is illustrated, it is to be understood that various modifications and rearrangements of parts may be restored to without departing from the scope of the invention disclosed and claimed herein.

What is claimed is:

1. In combination, an industrial vehicle for material handling or the like having an operator station including a seat, and an overhead guard for protecting an operator seated in the seat from falling objects, the guard including a rigid metal frame as one component generally surrounding the operator station, the frame including rigid supporting elements at points forward and rearward of the operator station and extending upwardly from the main body of the vehicle to a zone generally above the operator station, and a rigid metal roof barrier as another component supported by the frame and including a generally planar main section substantially completely overlying said operator seat, said roof barrier being shiftable on the frame between an extended position for maximum head room and a retracted position for maximum clearance of overhead structures, said roof barrier main section maintaining its overlying relationship with said operator seat and being disposed in generally horizontal planes in both of said positions, and means on one of said components for selectively maintaining said roof barrier at either said extended position or said retracted position, said rigid frame and roof barrier being constructed and arranged on said vehicle in such a manner that falling objects striking said roof barrier are prevented from entering said operator station as a result of the physical obstruction to such objects formed by said roof barrier.

2. An overhead guard for a lift truck or the like comprising a rigid metal frame including a plurality of generally vertical legs at the front and rear of the guard and a set of generally horizontal bars interconnected between each of said legs at points adjacent their upper ends, said frame having an upper generally horizontal face and including generally horizontal supporting surfaces at its upper face, a generally planar metal roof barrier carried on said frame in a generally horizontal plane, means for selectively supporting and maintaining said roof barrier both in a horizontal elevated extended position on said frame and alternatively in a horizontal retracted or lower position on said frame, said retracted position of said roof barrier being adjacent said upper frame face, said roof barrier being constructed and arranged to be supported by the support surfaces of said frame face when struck by an overhead load whereby the structural integrity of said frame limits the displacement of said roof barrier below said retracted position and the strength and impenetrability of said roof barrier prevents entry of such load into a zone below said roof barrier.

3. An overhead guard as set forth in claim 2 including guide means for substantially limiting movement of said roof barrier relative to said frame in a vertical direction.

4. An overhead guard as set forth in claim 3 wherein said guide means includes means for permitting said roof barrier to be raised or lowered one-half at a time.

5. An overhead guard as set forth in claim 3 wherein said guide means is an elongated element extending in a generally horizontal direction along a substantial portion of said roof barrier and provides direct structural support for said roof barrier in both said extended and retracted positions.

6. An overhead guard as set forth in claim 5 wherein said roof barrier has a generally rectangular configuration, said guide means being provided at areas adjacent both long edges of said roof barrier.

7. An overhead guard as set forth in claim 5 wherein said generally horizontal bars of said frame form a generally rectangular array and said roof barrier has a generally rectangular configuration substantially coextensive and superposed with said rectangular array, said guide means including U-shaped stirrup elements depending from a lower face of said roof barrier and encircling an opposed pair of said horizontal frame bars.

8. An overhead guard as set forth in claim 2 including counterbalancing means carried by said frame for supporting the weight of said roof barrier whereby said roof barrier is readily manually manipulable between said extended and retracted positions.

9. An overhead guard as set forth in claim 8 wherein said counterbalancing means is arranged to provide a force at least as great as the weight of said roof barrier.

10. An overhead guard as set forth in claim 8 wherein said counterbalancing means comprises a compression spring in each of said legs and being operative to apply an upwardly directed force on said roof barrier.

11. An overhead guard as set forth in claim 10 including anti-friction means disposed between said compression springs and said overhead guard.

12. An overhead guard as set forth in claim 9 including guide means for limiting movement of said roof barrier relative to said frame in a generally vertical direction, said guide means comprising U-shaped stirrup members depending from said roof barrier and encircling a pair of said horizontal frame bars, the upper limit of movement of said roof barrier relative to said frame being determined by interengagement between the stirrups and the underside of said pair of horizontal roof bars and the lower limit of said roof barrier being determined by interengagement between the roof barrier and the top side of said horizontal roof bars.

13. An overhead guard for a lift truck or the like comprising a frame and a roof barrier, the frame including four generally vertical legs, the legs being formed of tube stock, four generally horizontal header bars interconnected at their ends between the upper ends of the legs, the roof barrier including a generally planar body having dimensions sufficiently large to cover a vertical zone bounded by said header bars, a pair of U-shaped stirrups fixed on an underside of the roof barrier along opposite edges thereof, each of said stirrups having a pair of vertical sidewall portions depending from said roof barrier and embracing one of said header bars, a bight wall portion of each stirrup being disposed beneath the associated header bar, the interior of the legs being exposed at their upper ends, a compression spring being disposed in the interior of each of said legs, means associated with each of said springs being arranged to telescope within the legs and support the roof barrier through said springs, said springs collectively counterbalancing the weight of the roof barrier, said roof barrier having extended and retracted operational positions on said frame, the extended position being limited by engagement of the bight wall portions of said stirrups with the undersides of their respective header bars, the retracted position being limited by engagement of the underside of the roof barrier with the upper surfaces of the header bars, and means for releasably locking said roof barrier in said lower position against the action of said springs.

* * * * *